(12) United States Patent
Malik et al.

(10) Patent No.: US 7,804,842 B2
(45) Date of Patent: Sep. 28, 2010

(54) CARRIER SENSE MULTIPLE ACCESS METHOD AND WIRELESS TERMINAL APPARATUS

(75) Inventors: Rahul Malik, Singapore (SG); Pek Yew Tan, Singapore (SG)

(73) Assignee: Panasonic Corporation, Osaka (JP)

( * ) Notice: Subject to any disclaimer, the term of this patent is extended or adjusted under 35 U.S.C. 154(b) by 615 days.

(21) Appl. No.: 10/572,033

(22) PCT Filed: Sep. 6, 2004

(86) PCT No.: PCT/JP2004/012956

§ 371 (c)(1),
(2), (4) Date: Mar. 15, 2006

(87) PCT Pub. No.: WO2005/029730

PCT Pub. Date: Mar. 31, 2005

(65) Prior Publication Data

US 2006/0274776 A1 Dec. 7, 2006

(30) Foreign Application Priority Data

Sep. 17, 2003 (JP) .......................... 2003-324793

(51) Int. Cl.
*H04L 12/413* (2006.01)
(52) U.S. Cl. .................. 370/445; 370/320; 370/241; 455/445; 455/422.1
(58) Field of Classification Search .......... 455/446, 455/447, 422.1; 380/270; 370/329, 241
See application file for complete search history.

(56) References Cited

U.S. PATENT DOCUMENTS 5,956,624 A * 9/1999 Hunsinger et al. ........... 455/65
6,483,819 B1 11/2002 Take et al.
6,522,650 B1 * 2/2003 Yonge et al. ................ 370/390
6,563,858 B1 * 5/2003 Fakatselis et al. ........... 375/148
6,611,531 B1 * 8/2003 Chen et al. .................. 370/458
6,625,162 B2 * 9/2003 Myojo et al. ................ 370/445

(Continued)

FOREIGN PATENT DOCUMENTS

JP 0 6037763 2/1994

(Continued)

OTHER PUBLICATIONS

PCT International Search Report dated Dec. 21, 2004.

(Continued)

*Primary Examiner*—Huy D Vu
*Assistant Examiner*—Zewdu Beyen
(74) *Attorney, Agent, or Firm*—Dickinson Wright PLLC (57) ABSTRACT

A carrier sense multiple access method capable of improving throughput in a wireless network is disclosed. This method is implemented in a wireless network—for example, a wireless LAN (100)—having an AP (110) that is equipped with a multi-beam antenna (111) that forms a directional beam and that is capable of SDMA, and a STA (120, 130, 140) that communicate with the AP (110). With this method, the AP (110) allots the STA (120 to 140) to a beam group defined by a coverage area of the directional beam, according to the location of the STA (120 to 140). Then, the allocated STA (120 to 140) is assigned a signature signal for group identification, the signature signal being unique to the group.

9 Claims, 10 Drawing Sheets

U.S. PATENT DOCUMENTS

| | | | |
|---|---|---|---|
| 6,650,717 B1 * | 11/2003 | Cupo et al. | 375/353 |
| 6,678,310 B1 * | 1/2004 | Andren et al. | 375/147 |
| 6,721,302 B1 * | 4/2004 | Alastalo | 370/346 |
| 6,865,174 B1 * | 3/2005 | Tsubouchi et al. | 370/342 |
| 6,870,826 B1 * | 3/2005 | Ishizu | 370/343 |
| 6,873,747 B2 * | 3/2005 | Askary | 382/295 |
| 6,968,164 B2 * | 11/2005 | Toporski | 455/150.1 |
| 6,990,116 B1 * | 1/2006 | Young et al. | 370/445 |
| 7,158,501 B2 * | 1/2007 | Kasami et al. | 370/339 |
| 7,170,873 B1 * | 1/2007 | Cisar et al. | 370/334 |
| 7,424,268 B2 * | 9/2008 | Diener et al. | 455/62 |
| 2002/0051430 A1 * | 5/2002 | Kasami et al. | 370/319 |
| 2002/0163933 A1 * | 11/2002 | Benveniste | 370/465 |
| 2002/0181492 A1 * | 12/2002 | Kasami et al. | 370/445 |
| 2003/0036404 A1 | 2/2003 | Adachi et al. | |
| 2003/0060169 A1 | 3/2003 | Takano | |
| 2003/0134664 A1 * | 7/2003 | Zancewicz | 455/562 |
| 2003/0223434 A1 * | 12/2003 | Hwang et al. | 370/395.62 |
| 2004/0002357 A1 * | 1/2004 | Benveniste | 455/550.1 |
| 2004/0030713 A1 * | 2/2004 | Takano et al. | 707/102 |
| 2004/0171407 A1 * | 9/2004 | Ninomiya | 455/561 |
| 2004/0203447 A1 * | 10/2004 | Lee | 455/67.11 |
| 2004/0224637 A1 * | 11/2004 | Silva et al. | 455/63.4 |
| 2004/0264548 A1 * | 12/2004 | Miyoshi | 375/141 |
| 2005/0068924 A1 * | 3/2005 | Lindskog et al. | 370/338 |
| 2007/0047570 A1 * | 3/2007 | Benveniste | 370/448 |
| 2007/0104171 A1 * | 5/2007 | Kasami et al. | 370/339 |
| 2008/0019329 A1 * | 1/2008 | Benveniste | 370/337 |
| 2009/0104903 A1 * | 4/2009 | Karabinis | 455/427 |

FOREIGN PATENT DOCUMENTS

| | | |
|---|---|---|
| JP | 2000 092545 | 3/2000 |
| JP | 2003 101515 | 4/2003 |
| JP | 2003 124878 | 4/2003 |
| JP | 2003 169367 | 6/2003 |

OTHER PUBLICATIONS

Part II: Wireless LAN Medium Access Control (MAC) and Physical Layer (PHY) Specifications, ANSI/IEEE Std 802.11, Aug. 1999 Edition, Local and Metropolitan Area Networks-Specific Requirements, pp. 1-528.

Part II: Wireless LAN Medium Access Control (MAC) and Physical Layer (PHY) specifications: "Higher-Speed Physical Layer Extension in the 2.4 Ghz Band," IEEE Std 802.11b- Sep. 1999, Local and Metropolitan area networks Specific Requirements, pp. 1-89.

Part II: Wireless LAN Medium Access Control (MAC) and Physical Layer (PHY) specifications: "High-Speed Physical Layer in the 5 Ghz Band," IEEE Std 802.11a- Sep. 1999, Local and Metropolitan Area Networks Specific Requirements, pp. 1-14.

Y. Xiao, et al.; "Throughput Analysis for IEEE 802.11a Higher Data Rates," IEEE 802.11-02/138r0, Mar. 2002, pp. 1-20.

* cited by examiner

| CCA VALUE | SIGNATURE SIGNAL DETECTION VALUE | DECREMENT TIME UNIT |
|---|---|---|
| IDLE | IDLE | SLOT TIME 604 |
| BUSY | IDLE | DETECTION TIME 605 |
| BUSY | BUSY (DETECTED) | N.A. (NO TRANSMISSION) 606 |

FIG.9

FIG.10

CARRIER SENSE MULTIPLE ACCESS METHOD AND WIRELESS TERMINAL APPARATUS

TECHNICAL FIELD

The present invention relates to a carrier sense multiple access (CSMA) method, wireless base station apparatus and wireless terminal apparatus, used in a wireless network such as a wireless LAN (Local Area Network).

BACKGROUND ART

IEEE802.11 provides a cost-effective solution for networking terminal apparatuses including computers, for example, by wireless. With new developments in signal processing and modulation technologies, enhancements have been made in standards supporting new physical layers with higher data rates. Studies have shown that the key limiting factor in current 802.11 system is the MAC (Medium Access Control) layer, where throughput saturates with increase in data rates (see, for example, non-patent document 1). The IEEE802.11 working group has identified the need for a high-throughput wireless LAN configured based on both MAC and PHY changes to existing wireless LANs.

For current applications and those envisioned for the future, the data rates supported by existing wireless LANs are sufficient. Wireless LANs have heretofore employed time division multiple access schemes, and the problem with this lies in the number of users of high data rate applications that the network can support at a time. The problem can be generalized as one of the need for higher throughput. To achieve higher throughput, it is necessary to improve data rates measured in layers above layer 2, or the medium access control (MAC) layer, in the open system interconnection (OSI) by the International Organization for Standardization (ISO). To meet the requirement of increasing throughput for all wireless terminal apparatuses in a typical wireless LAN system containing a single wireless base station apparatus (for example, an access point (AP)) and a plurality of wireless terminal apparatuses (STAs), throughput is measured at the AP.

Communication in a conventional wireless LAN system is based on the CSMA scheme. That is, whether or not an STA is able to transmit a data packet is determined by detecting whether or not a medium to be accessed is busy (occupied) or idle (unoccupied). One approach to improve throughput in this wireless LAN system is to exploit the benefits of the space division multiple access (SDMA) scheme. However, optimum scheduling is necessary for this purpose, such as, for example, performing transmission and reception with different STAs with antennas of different APs.

Non-patent Document 1: "Throughput Analysis for IEEE 802.11a Higher Data Rates", doc.: IEEE 802.11/02-138r0, March 2002.

DISCLOSURE OF INVENTION

Problems to be Solved by the Invention

However, in a conventional wireless LAN system, STAs access a medium by a contention-based access scheme (whereby a plurality of STAs contend for the right to access the medium) such as the CSMA scheme, and hold transmission of data packets when detecting that the medium is busy. Consequently, at each access timing, only one of a plurality of STAs contained in the wireless LAN system is able to perform data packet transmission. Consequently, it is not simple to improve throughput in a wireless LAN system.

It is therefore an object of the present invention to provide a carrier sense multiple access method, wireless base station apparatus and wireless terminal apparatus, that is capable of improving throughput in a wireless network.

Means for Solving the Problem

A carrier sense multiple access method according to the present invention is implemented in a wireless network having a wireless base station apparatus that is capable of space division multiple access and a wireless terminal apparatus that communicates with the wireless base station apparatus, the wireless base station apparatus having an antenna section that forms a directional beam and a plurality of transmission and reception sections that are connected with the antenna section and are capable of parallel operation, and the method is configured with: an allocation step of allocating the wireless terminal apparatus to a group defined by a coverage area of the directional beam according to a location of the wireless terminal apparatus; an assigning step of assigning a signature signal to the wireless terminal apparatus allocated in the allocation step, the signature signal being unique to the group; a detection step of detecting whether or not the signature signal assigned in the assigning step is present in a medium to be accessed; and a transmission step of transmitting the signature signal and a data packet addressed to the wireless base station apparatus concurrently when the signature signal is not present in the medium as a result of the detection in the detection step.

A wireless base station apparatus according to the present invention is capable of space division multiple access and has an antenna section that forms a directional beam and a plurality of transmission and reception sections that are connected with the antenna section and are capable of parallel operation, and the wireless base station apparatus employs a configuration having: an allocation section that allocates a wireless terminal apparatus to a group defined by a coverage area of the directional beam according to a location of the wireless terminal apparatus, the wireless terminal apparatus being a communicating partner; an assigning section that assigns a signature signal to the allocated wireless terminal apparatus, the signature signal being unique to the group; and a reporting section that reports the assigned signature signal to the wireless terminal apparatus.

A wireless terminal apparatus according to the present invention employs a configuration having: a reception section that receives a signature signal, the signature signal being unique to a group defined by a coverage area of a directional beam formed by an antenna section of a wireless base station apparatus and being reported from the wireless base station apparatus, the wireless base station apparatus being a communicating partner; a detection section that detects whether or not the signature signal is present in a medium to be accessed; a decrement section that decrements a backoff value when the signature signal is not present in the medium as a result of the detection in the detection section; and a transmission section that transmits the signature signal and a data packet addressed to the wireless base station apparatus concurrently when the backoff value is decremented down to zero by the decrement section.

Advantageous Effect of the Invention

According to the present invention, it is possible to improve throughput in a wireless network.

BEST MODE FOR CARRYING OUT THE INVENTION

Now, embodiments of the present invention will be described below in detail with reference to the accompanying drawings.

A case will be described below with this embodiment where wireless terminal apparatuses (hereinafter referred to as "STAs") is allocated to groups determined according to the coverage range of directional beams formed by the antenna section of a wireless base station apparatus ("AP" in this embodiment), and each group is assigned a unique signature signal so that each STA has a signature signal.

An AP and STAs will be described here that execute an CSMA algorithm according to an embodiment of the present invention (hereinafter referred to as the "enhanced CSMA algorithm") that enables a plurality of STAs in a wireless LAN to concurrently perform medium contention and data packet transmission and that therefore improves overall throughput of the wireless LAN. To help understand the present invention, the following definitions will be used:

A "wireless LAN" refers to a wireless local area network, which may include an arbitrary number of devices or nodes in order to provide LAN services to STAs through wireless access technologies.

A "station (STA)" refers to a device that is capable of accessing services provided by a wireless LAN.

An "access point (AP)" refers to a wireless base station apparatus in a wireless LAN that serves the role of controlling access to the wireless LAN and maintaining access timing. The primary role of the AP is to function as a bridge so that STAs in a wireless LAN access devices in other networks.

"Space division multiple access (SDMA)" refers to an access mechanism whereby a plurality of STAs can concurrently use the same band and perform communication, by virtue of their physical separation in space and the ability of the transmission and reception section to transmit and receive signals (data packets) using directional beams.

"Medium" refers to wireless channels where a wireless LAN operates.

A "multi-beam antenna" refers to an antenna system that is capable of forming directional beams in different directions with minimum cross-over and inter-beam interference so as to implement SDMA.

A "medium access control (MAC) layer" refers generally to the network protocol used by individual STAs in order to enable access to a medium.

A "physical (PHY) layer" refers to the actual transmission and reception section that transmits and receives signals in a wireless LAN, which can be generalized to consist of several sub-layers including a convergence layer from the MAC and a control layer.

"Uplink" refers to the direction of transmission from STA to AP.

"Downlink" refers to the direction of transmission from AP to STA (for example, unicast, multicast or broadcast).

A "concurrent communication group" refers to a set of STAs that are covered by one or more directional beams formed by an SDMA-capable AP equipped with a multi-beam antenna.

A "beam range" refers to the coverage area of one or more directional beams formed concurrently by an AP.

A "beam group" refers to a set of STAs covered by one or more directional beams formed concurrently by an AP.

A "beam start beacon frame" refers to a frame broadcast by an AP over the whole of a group's beam range so as to announce the start of the group's access period. It may be a frame which optionally contains information pertaining to the downlink period and schedule for that beam/group.

A "beam-end beacon frame" refers to a frame broadcast by an AP to STAs in a beam group/concurrent communication group so as to announce the end of the group's access period.

A "poll+supervised contention announcement frame" refers to a frame that is broadcast by an AP to STAs belonging to beam groups so as to announce users the start of an uplink access period, schedules for STAs to perform uplink access and the period during which access is allowed on a contention basis.

"Contention-based channel access" refers to a MAC mechanism whereby individual STAs access a shared medium based on a distributed contention algorithm executed by each STA without scheduling so as to ensure fairness in the medium access.

"Poll-based channel access" refers to a MAC mechanism whereby access to a shared medium is regulated by centralized control that allocates access to the medium by polling individual STAs.

A "hidden terminal" refers to an STA that is located within an area that can be covered by beams irradiated from an AP yet is located outside an area that can be covered by beams irradiated from another STA. Such scenario may occur when a plurality of STAs are physically located at diametrically opposite ends of a wireless LAN.

"Carrier sense multiple access (CSMA)" refers to a contention-based channel access technique that involves the process of detecting that a medium has been idle for a certain period of time, waiting for a random backoff value and thereafter performing data packet transmission.

"Clear channel assessment (CCA)" refers to an algorithm that is used by a CSMA-based STA to determine the state of a medium (busy or idle).

A "signature signal" refers to a signal that is assigned to member STAs of each beam group, using which an STA determines whether or not other STAs in the same beam group active or transmitting.

A "slot time" is defined as a constant unit of time, including the CCA detection time, round-trip propagation delay time and MAC processing time.

A "detection-time" is defined as a constant unit of time required to detect whether or not a signature signal is present in a medium.

In the following descriptions, for purposes of explanation, specific numbers, times, structures, protocol names and other parameters will be given in order to provide a thorough understanding of the present invention. However, it is still obvious to one skilled in the art that the present invention may be implemented without these specific details. In other instances, well-known components and modules are shown in block diagrams in order not to obscure the present invention unnecessarily.

For a thorough understanding of the invention, in the following description, some operation sequences, data structures and calculation techniques for calculation will be presented. Certain data structures will be used, serving only as an example of implementation of the present invention. It is obvious to one skilled in the art that in real implementation, new information could be added, and certain parts could be omitted depending on the actual scenario that applies to the present invention.

Figure 1:
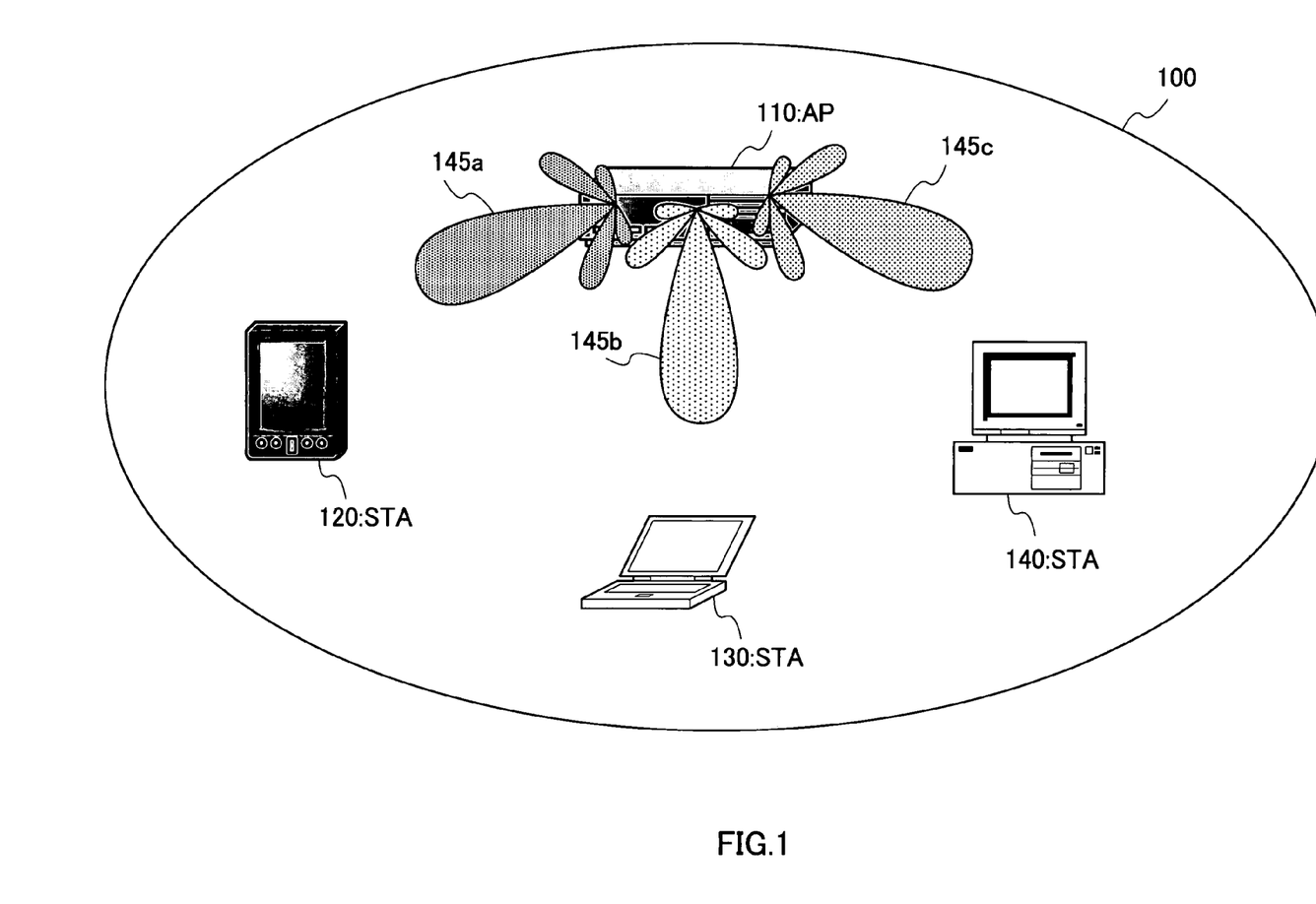
FIG. 1 is a view showing a wireless LAN where a CSMA method according to an embodiment of the present invention is implemented.

FIG. 1 is a view showing a wireless LAN where a CSMA method according to an embodiment of the present invention is implemented.

Wireless LAN network 100 shown in FIG. 1 is a typical wireless LAN consisting of AP 110 and a plurality of STAs 120, 130 and 140. In addition, FIG. 2 provides a block diagram of the configuration of wireless LAN 100.

Figure 2:
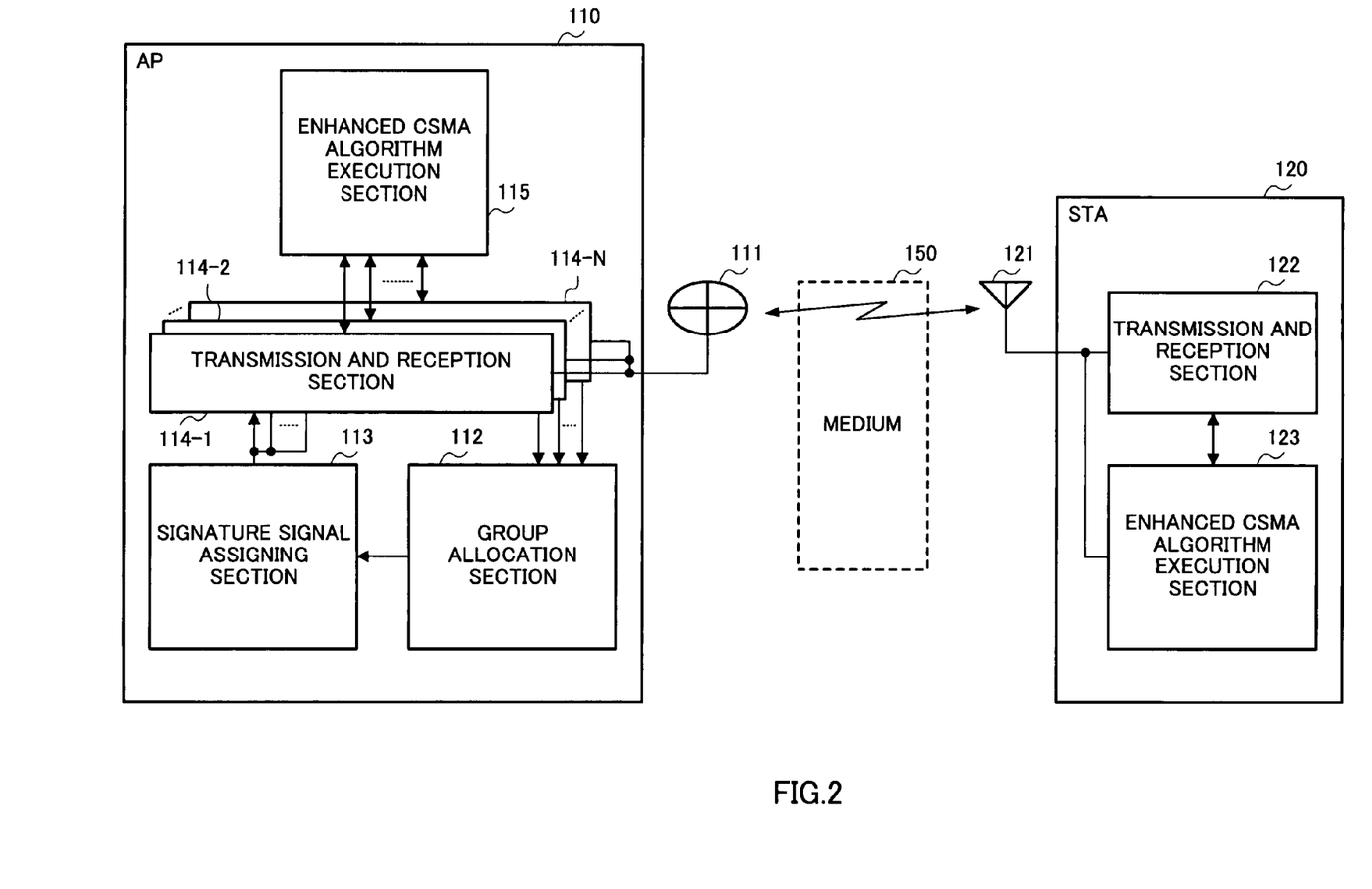
FIG. 2 is a block diagram showing a configuration of a wireless LAN according to an embodiment of the present invention.

STAs 120 to 140 basically have the same internal configuration, and so FIG. 2 shows only the internal configuration of STA 120 and omit the internal configurations of STAs 130 and 140. Obviously, the STAs included in wireless LAN 100 are not limited to three STAs 120 to 140. In addition, in the following descriptions, one or more STAs included in wireless LAN 100 will be sometimes referred to as "user(s)."

AP 110 is a fixed network infrastructure device and has multi-beam antenna 111 that is capable of forming a plurality of spatially separated directional beams 145a, 145b and 145c and minimizing inter-beam crossover and interference. In addition, AP110 has: group allocation section 112 that allocates STAs 120 to 140 in wireless LAN 100 to beam groups according to the locations of STAs 120 to 140; signature signal assigning section that assigns signature signals, which are unique to the respective groups, to allocated STAs 120 to 140; and a plurality of transmission and reception sections 114-1, 114-2 . . . 114-N that are connected with multi-beam antenna 111 and are capable of parallel operation and that govern wireless communication of STAs 120 to 140 including signaling of signature signals to STAs 120 to 140, and transmission and reception of data packets with STAs 120 to 140. Below, an unspecified one of transmission and reception sections 114-1 to 114-N will be referred to as "transmission and reception section 114." In addition, like enhanced CSMA algorithm execution section 123 in STAs 120 to 140, AP 110 has enhanced CSMA algorithm execution section 115 for executing an enhanced CSMA algorithm.

Generally, STA 120 is small due to the requirements of portability and mobility, and uses a simple antenna (usually consisting of only one element), which is capable of forming an omni-directional or nearly omni-directional beam radiation pattern. In addition, STA 120 has: transmission and reception section 122 that governs wireless communication with AP 110, including reception of signature signals signaled from AP 110 and transmission and reception of data packets with AP 110; and enhanced CSMA algorithm execution section 123 that executes an enhanced CSMA algorithm when transmission is going to be made to AP 110. The enhanced CSMA algorithm will be described later in detail. STAs 130 and 140 have the same configuration as that of STA120 and implement the same operations.

AP 110 is equipped with multi-beam antenna 111 and is capable of forming a set of beams directed in a plurality of different directions including an omni-directional beam radiation pattern.

Depending on the spatial or angular separation between users (for example, STAs 120 to 140), their traffic patterns and the capabilities of the access point including the number of beams that can be formed and their resolution, group assigning section 112 assign users to beam groups, so as to optimize the use of medium 150. Then, signature signal assigning section 113 assigns, to allocated users, signature signals that are uniquely associated with the respective groups.

Signature signal assignment is performed in the group allocation phase (that is, while users are assigned to concurrent communication groups and beam groups). In addition, signature signals may be reassigned at any time users move or are reallocated to new concurrent communication groups or beam groups.

By thus assigning a signature signal to data packets when a user transmits data packets, it is possible to determine whether other users contending for medium 150 are users of the same beam group. If a user performs transmission while another user from the same beam group is performing transmission, collision occurs and transmission is held. It is also possible to determine whether users of different beam groups are performing transmission. In this case, AP 110 is able to receive two transmissions separately based on angular separation between a plurality of users, thereby enabling a plurality of users contending for medium 150 to perform transmission at the same time.

Then, transmission and reception section 114 reports signature signals to users through one-to-one frame exchange or information element signaling exchange. AP 110 signals the start and end of the period users in beam groups are allowed to access medium 150 to users, thereby providing services to users in beam groups in time division.

Traffic in wireless LAN 100 is characterized as uplink or downlink. To prevent collisions in other beams (based on the assumption that STAs use omni-directional antennas) and collisions produced by AP 110 itself (due to imperfect isolation in practical design of RF components), the transmission and reception operations must always be kept synchronized at AP 110 for all beams. To be more specific, synchronization is maintained for periods that are assigned to a plurality of users of concurrent communication groups and divided for uplink or downlink. In addition, the occurrence of these periods is synchronized between different beam groups in a concurrent communication group. This timing structure will be described with reference to FIG. 3.

Figure 3:
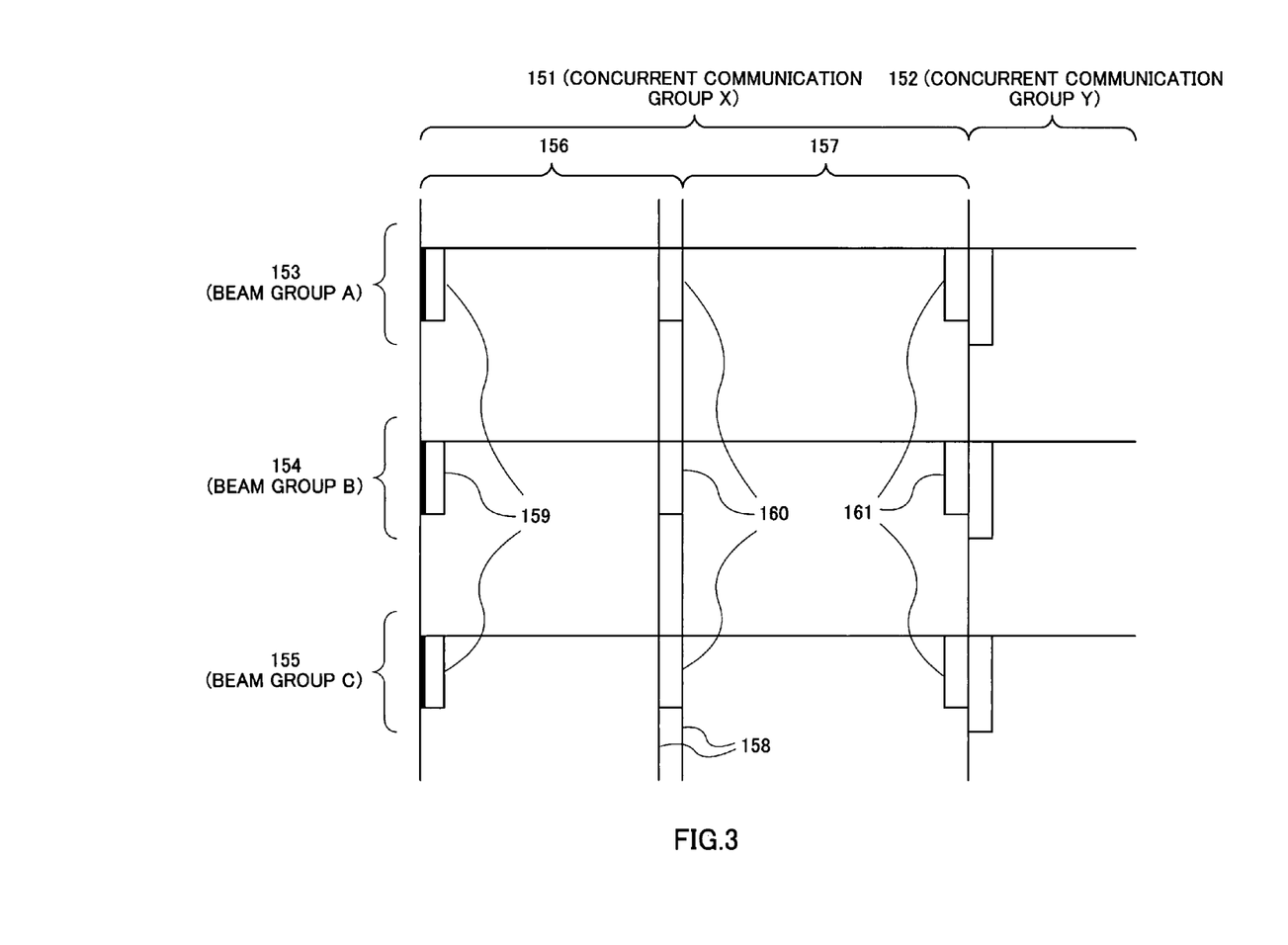
FIG. 3 is a view for explaining access timing structure according to an embodiment of the present invention.

FIG. 3 is a view showing an example of an access timing structure where AP 110 divides users in wireless LAN 100 in two concurrent communication groups X and Y. An explanation will be given here with primary focus on access period for concurrent communication group X.

Users belonging to concurrent communication group X are allowed access in access period 151. Users belonging to concurrent communication group Y are allowed access in access period 152. Concurrent communication groups X and Y are comprised of three concurrently formed beam groups A, B and C. Transmission pattern 153 is for users belonging to beam group A. Transmission pattern 154 is for users belonging to beam group B. Transmission pattern 155 is for users belonging to beam group C.

Access period 151 for concurrent communication group 151 is divided in downlink access period 156 and uplink access period 157. Reference numeral 158 marks time position alignment and synchronization of downlink access period 156 and uplink access period 157 in a concurrent communication group.

Beam start beacon frame 159 is broadcast by AP 110. Beam start beacon frame 159 marks the start of access period 151 assigned to concurrent communication group X, the length of downlink access period 156, and, optionally, downlink transmission schedules in beam groups A, B and C.

Poll+supervised contention announcement frame 160 is the last frame transmitted in downlink access period 156 and announces schedules for a plurality of users under differing beam groups A, B and C of concurrent communication group X. Poll+supervised contention announcement frame 160 also announces the remaining period access is possible on a contention basis after the scheduled transmissions of a plurality of users under beam groups A, B and C are completed. Reference numeral 161 designates a beam end beacon frame marking an end of access period 151 for a plurality users belonging to concurrent communication group X. Beam end beacon frame 161 is broadcast by AP 110. Similar transmission patterns apply to all other concurrent communication groups including concurrent communication group Y.

Network traffic may be classified according to statistics such as data rates, packet inter-arrival rates and packet delay bounds. Generic MAC mechanisms include the contention-based mechanism and the poll-based mechanism. Poll-based channel access is an efficient mechanism for traffic that requires a certain QoS, which may be characterized in terms of certain band and delay bounds. Examples of such traffic include audio/video, voice and other multimedia contents. On the other hand, contention-based channel access is a mechanism intended to serve traffic that is random and non-periodic, including hyper-text transfer protocols, etc.

As mentioned above, SDMA is subject to a stringent synchronization requirement. Consequently, poll-based channel access is favorable, in that, by optimally scheduling uplink and downlink traffic of different beam groups, AP 110 can efficiently spatially reuse the channel band, resulting in higher overall throughput. It is obvious that traffic emanating from AP 110, that is, downlink traffic, can be easily scheduled because AP 110 knows traffic characteristics. However, with regularly recurring uplink traffic, the user (transmission source) is generally required to make a resource reservation so that AP 110 is able to grant band in poll+supervised contention announcement frame 160.

Figure 4:
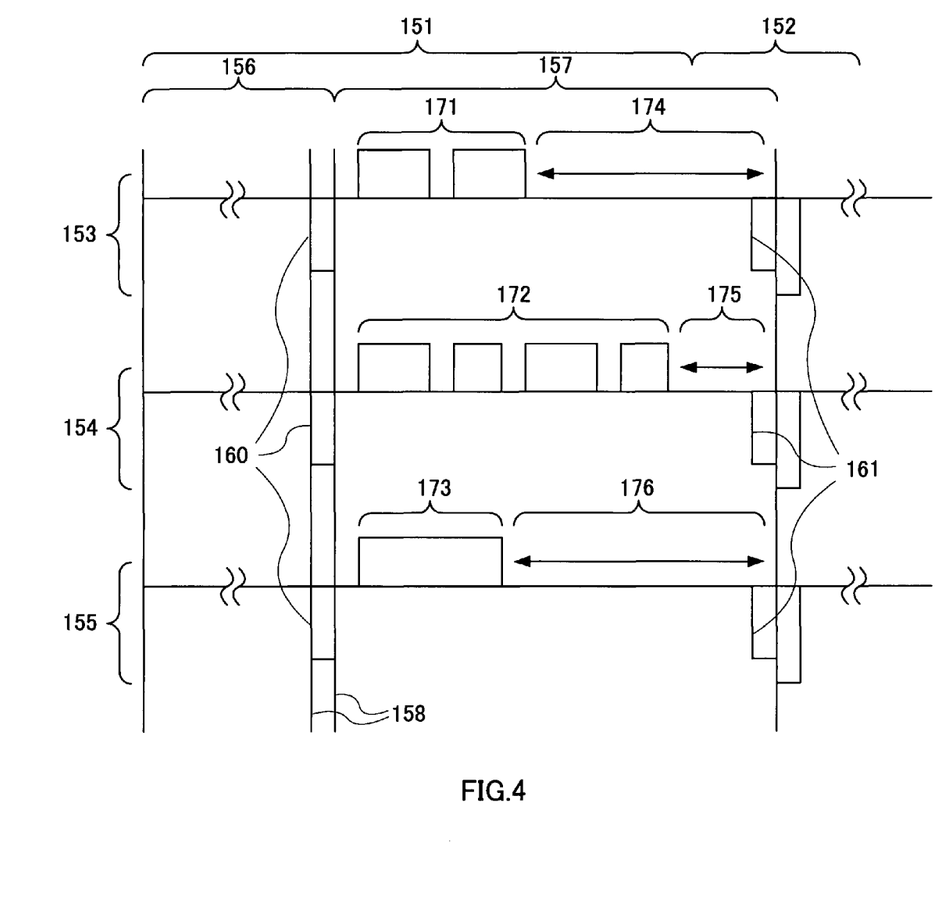
FIG. 4 is a view showing transmission pattern in uplink access period in detail according to an embodiment of the present invention.

FIG. 4 illustrates transmission patterns in uplink access period 157 described with reference to FIG. 3 in detail.

An example of the transmission pattern of beam group A of concurrent communication group X will be described here, where transmission of poll+supervised contention announcement frame 160, which marks the end of downlink access period 156, announces schedules for beam groups A, B and C in uplink access period 157.

During uplink access period 157, users first perform transmission in poll-based access periods 171, 172 and 173 in accordance with the schedules announced in poll+contention announcement frame 160. After scheduled poll-based access periods 171 to 173 are over, the remaining periods are used as contention-based access periods 174, 175 and 176. During poll-based channel access, users determine timing to perform transmission based on their announced schedules and local clocks.

A carrier sense technology underlies the mechanism of contention-based channel access, which includes the process of confirming that a medium has been idle for a certain period of time before attempting at transmission. In SDMA-based wireless LAN 100 where AP 110 employs multi-beam antenna 111 while users employ simpler and smaller form-factor omni-directional antenna 121, a user belonging to beam group A—that is, a user located in the beam range of beam group A—would hold or defer transmission while a user belonging to beam group B or beam group C is performing transmission. Multi-beam antenna 111 has directivity, so that AP 110 is able to resolve a plurality of transmissions originating from different beam ranges. Situation may occur where, due to physical separation between a plurality of users and use of power control alone, users located in different beam ranges become "hidden terminals" and as a result end up accessing uplink concurrently. However, in reality, users are rarely spread in such a way.

Based on the example of FIG. 4, poll-based access period 173 of beam group C ends earlier than poll-based access periods 171 and 172 of beam groups A and B. As a result, contention-based access period 176 of beam group C starts earlier than contention-based access periods 174 and 175 of beam groups A and B.

AP 110 is able to resolve a plurality of transmissions originating from separate areas. A user belonging to beam group C is able to start contention-based channel access without waiting for the end of transmission in poll-based access periods 171 and 172, by utilizing the CSMA algorithm according to the present invention. Likewise, as for beam groups A and B, once poll-based access periods 171 and 172 of the groups are over, contention-based access periods 174 and 175 can be started. Consequently, waste of channel band can be reduced largely. In addition, users belonging to beam groups A, B and C are able to access a medium concurrently, so that, at each timing, the number of users that can be allowed access can be increased compared to prior art.

Figure 5:
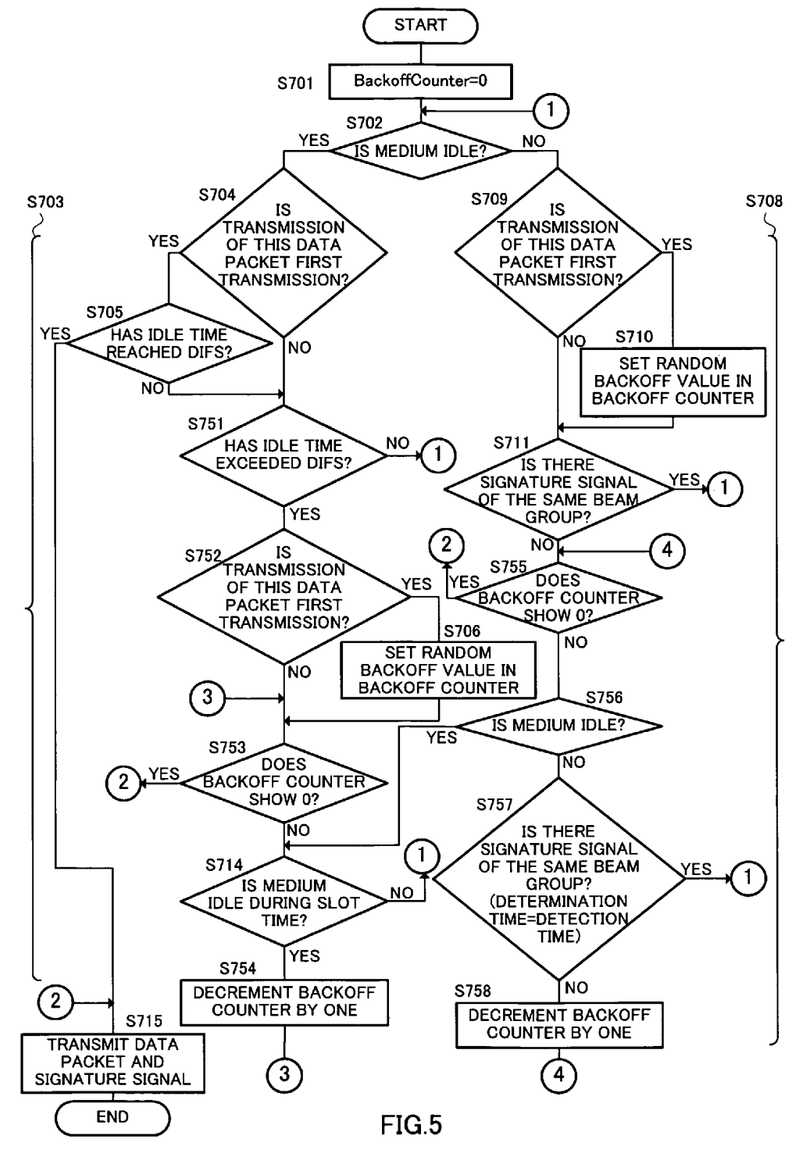
FIG. 5 is a flowchart for explaining an enhanced CSMA algorithm according to an embodiment of the present invention.

Next, the enhanced CSMA algorithm executed in STA 120 (also in STAs 130 and 140) will be described. FIG. 5 is a flowchart for explaining an enhanced CSMA algorithm according to an embodiment of the present invention.

First, in step S701, the backoff counter value is rest to 0. Following this, in step S702, a CCA algorithm is used to determine whether medium 150 is busy or idle. The CCA algorithm is based on received power level of the channel. According to the IEEE 802.11a specification, there are two requirements on detection probability depending on whether or not the preamble of a signal is detected. STA 120 generally uses omni-directional antenna 121, so that, when there is an STA performing transmission in a given beam range, medium 150 is determined to be busy at an STA in another beam range.

As a result of the CCA algorithm, if medium 150 is determined to be busy (S702: YES), the flow proceeds following the first stage S703 side, and first proceeds to step S704. In step S704, whether or not a data packet that is going to be transmitted is new—that is, whether or not the transmission is the first transmission attempt—is determined. When the data packet is new (S704: YES), the flow proceeds to step S705, and, when the data packet is not new—that is, when the transmission is an attempt for the second time or more (S704: NO)—the flow proceeds to step S751. Incidentally, first stage S703 represents a conventional CSMA algorithm.

In step S705, whether the idle duration time of medium 150 has reached (or become the same as or exceeded) DIFS (Distributed Inter-Frame Space) is determined. When the idle duration time is the same as or has exceeded DIFS (S705: YES), the flow proceeds to step S715 and a data packet is transmitted immediately. On the other hand, when the idle duration time is less than DIFS (S705: NO), the flow proceeds to step S751.

In step S751, whether or not the idle duration time of the medium has reached DIFS is determined. When medium 150 changes to a busy state before the idle duration time reaches DIFS (S751: NO), the flow immediately returns to step S702, and, when the idle state continues until reaching DIFS (S751: YES), the flow proceeds to step S752.

In step S752, as in step S704, whether or not a data packet that is going to be transmitted is new—that is, whether or not the transmission is the first transmission attempt—is determined. If this is the first transmission attempt (S752: YES), a random backoff value is selected and set as the backoff counter value (S706), and then the flow proceeds to step S753. In the event of a transmission attempt for the second time or more (S752: NO), no action is incurred and the flow simply proceeds to step S753. The random backoff value is a value set as a random integer multiple of a slot time.

In step S753, whether or not the backoff counter value is 0 is determined. When the backoff counter value is 0 (S753: YES), the flow proceeds to step S715 and a data packet is immediately transmitted. When the backoff counter value is not 0 (S753: NO), the flow proceeds to step S714.

In step S714, whether or not the idle state of medium 150 continues for the slot time is determined. As a result of this determination, if the state changes to a busy state before reaching the slot time (S714: NO), the flow returns to step S702. When the idle state continues for the slot time (S714: YES), the backoff counter value is decremented by one in step S754. After the decrement, the flow returns again to step S753 and steps S753, S714 and S754 repeat until the backoff counter value becomes 0 and transmission is performed or until medium 150 enters a busy state.

Meanwhile, in step S702, if medium 150 is determined to be in a busy state (S702: NO), the flow proceeds to second stage S708. Second stage S708 represents part of the enhanced CSMA algorithm. In step S709, which is the first step in second stage S708, like in step S751, whether or not a data packet that is going to be transmitted is new—that is, whether the transmission is the first transmission attempt—is determined. If the transmission is the first transmission attempt (S709: YES), a random backoff value is selected and set as the backoff counter value (S710) and then the flow proceeds to step S711. If the transmission is a transmission attempt for the second time o more, no action is incurred and the flow simply proceeds to step S711.

In step S711, whether or not a signature signal of the same group as that of the STA attempting at transmission of this data packet is detected, is determined. IF the signature signal of the same beam group is detected—that is, if another STA in the same beam group is transmitting a data packet (S711: YES)—the flow returns to step S702, and, if the signature signal is not detected (S711: NO), the flow proceeds to step S755.

In step S755, whether or not the backoff counter value is 0 is determined. If the backoff counter value is 0 (S755: YES), the data packet is immediately transmitted (S715). If the backoff counter value is not 0, the flow proceeds to next step S756.

In step S756, whether medium 150 is in an idle state or busy state is determined using CCA. If medium 150 is determined to be idle (S756: YES), the flow immediately proceeds to step S714 of first stage S703. If medium 150 is still in a busy state (S756: NO), the flow proceeds to step S757.

In step S757, again, whether or not the signature signal of the same beam group is detected is determined. The determination period in this step is the detection time. In this step, if the signature signal of the same beam group is detected (S757: YES), the flow immediately returns to step S702. On the other hand, if the signature signal of the same beam group is not detected (S757: NO), the flow proceeds to step S758 and the backoff counter value is decremented by one. After the decrement, the flow returns to step S755 again.

While the decrement (S754) in the process of first stage S703 is made in slot time units, the decrement (S758) in the process of second stage S708 is made in detection time units, because, depending on the nature of the signature signal used, the detection time can be longer than the slot time. In this case, if the backoff counter value is decremented in slot time units, the backoff counter value may become 0 before the detection time of one signature signal is over. This suggests that, as a result, transmission is carried out only to make collision. Decrementing in detection time units therefore may prevent the occurrence of such situations.

A primary requirement in the above-noted enhanced CSMA algorithm is that STA 120 is able to detect the signature signals of other STAs 130 and 140 in medium 150 where a plurality of transmissions are performed concurrently.

Figure 6:
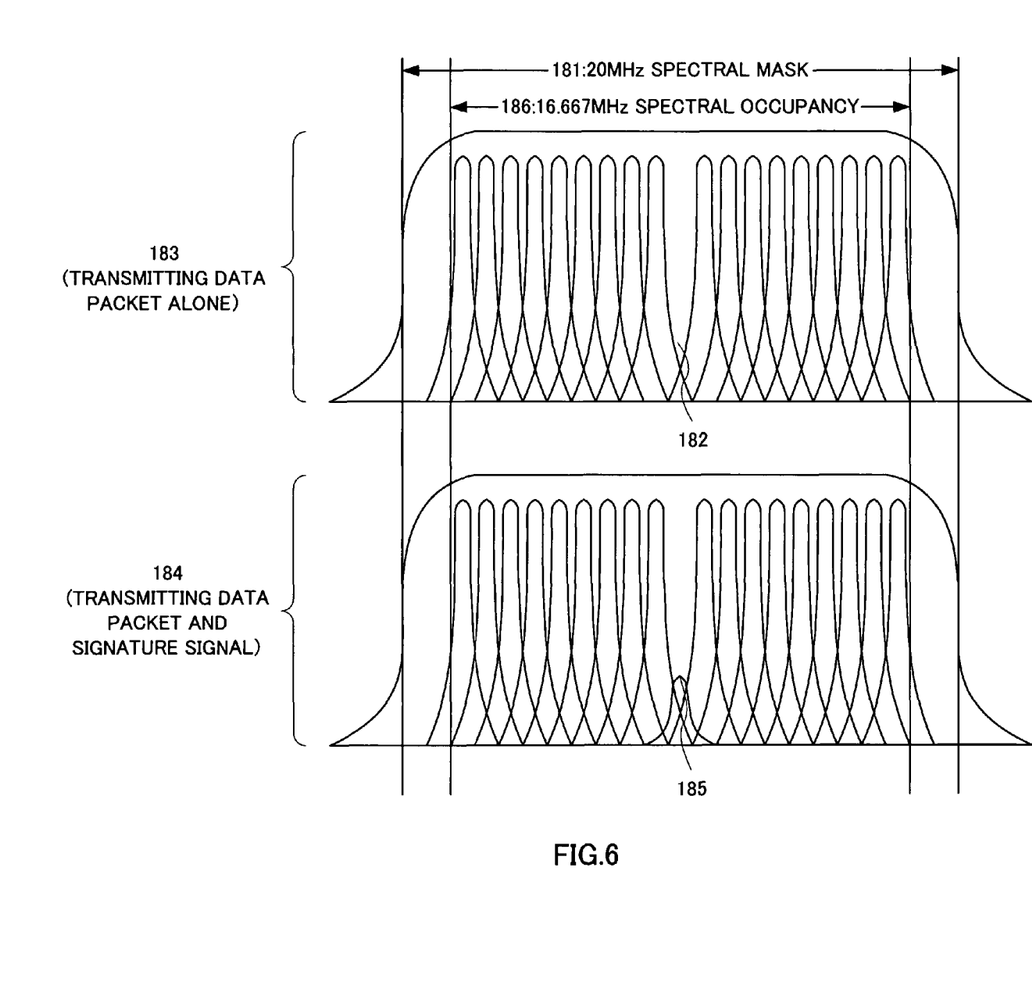
FIG. 6 is a view for explaining a first example of a signature signal transmission method according to an embodiment of the present invention.
Figure 7:
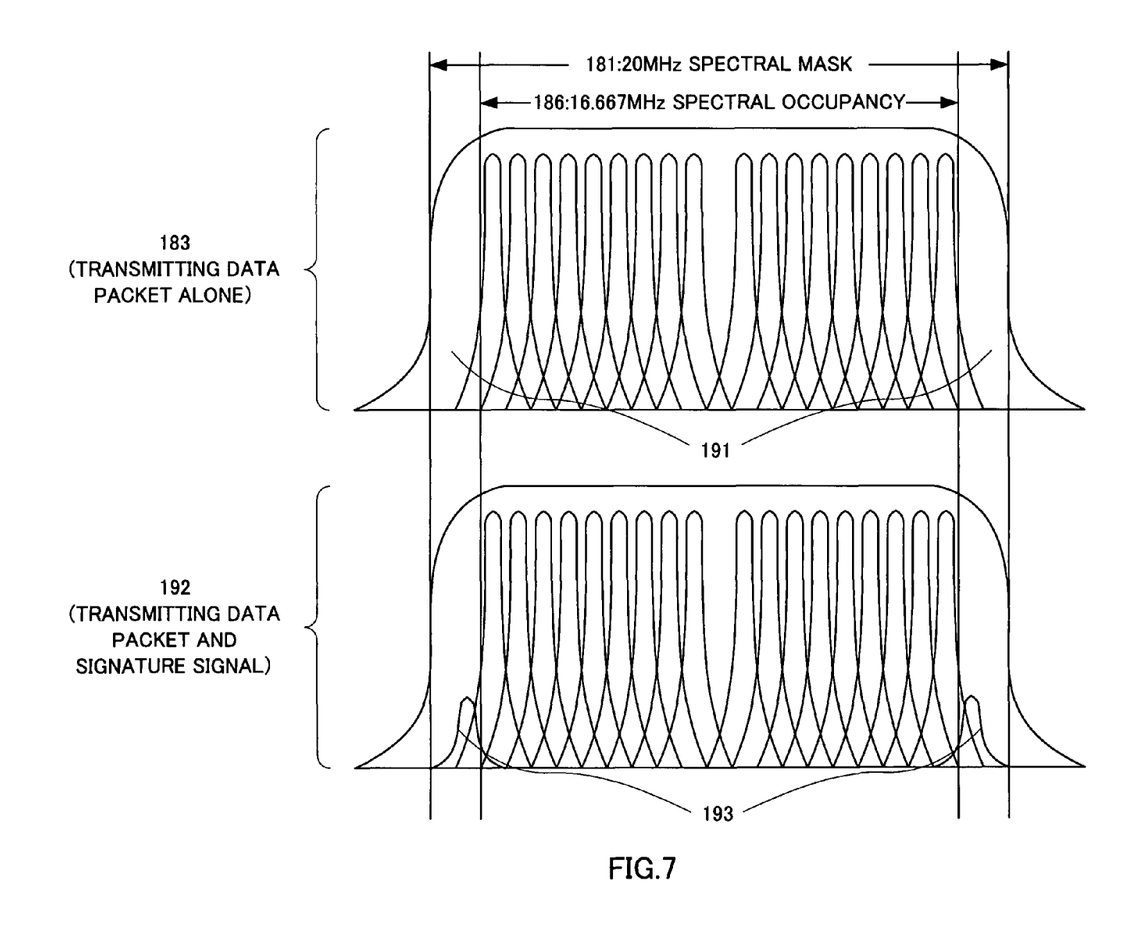
FIG. 7 is a view for explaining a second example of a signature signal transmission method according to an embodiment of the present invention.
Figure 8:
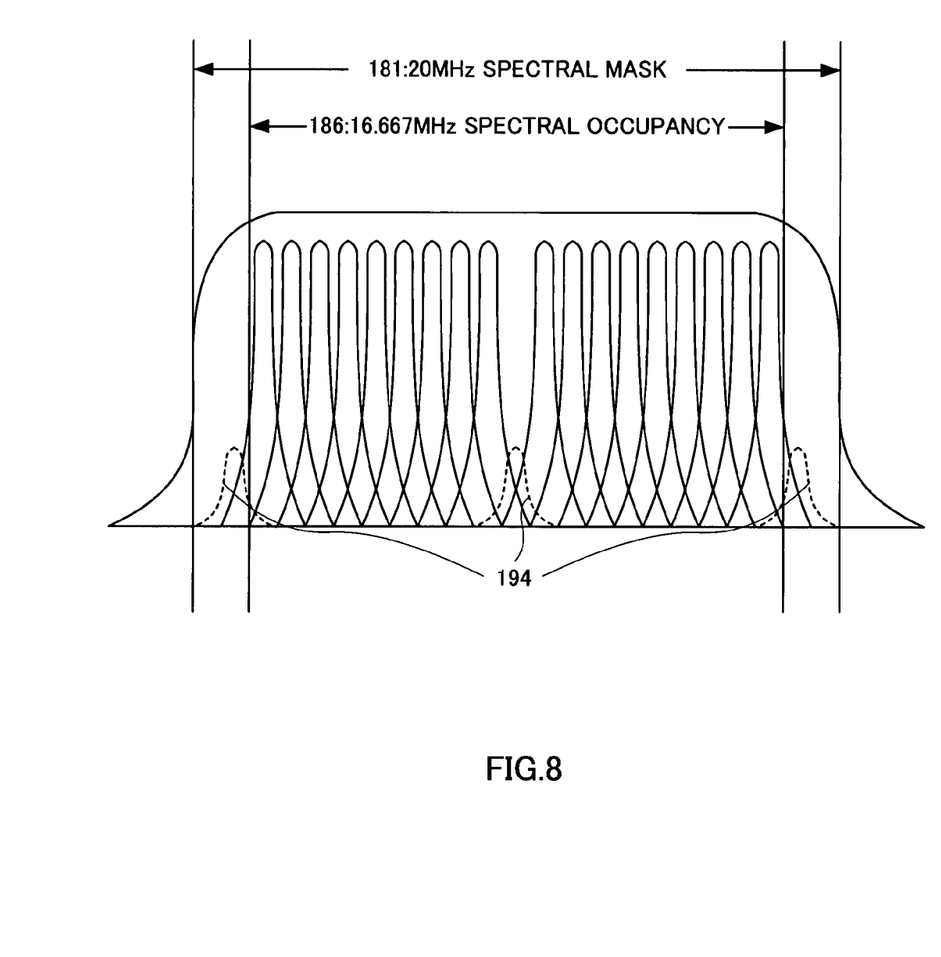
FIG. 8 is a view for explaining a third example of a signature signal transmission method according to an embodiment of the present invention.

The method of transmitting signature signals will be described below in three examples. FIG. 6 is a view for explaining the first example of the signature signal transmission method. FIG. 7 is a view for explaining the second example of the signature signal transmission method. FIG. 8 is a view for explaining the third example of the signature signal transmission method.

Wireless LAN 100, operating in the 5 GHz UNII (Unlicensed National Information Infrastructure) band, operates using 20 MHz channelization. In the example shown in FIG. 6, the frequency of the zero-th subcarrier 182 (that is, the center part of the spectrum used), which conforms to 20 MHz spectral mask 181 in OFDM (Orthogonal Frequency Division Multiplexing) transmission and which nevertheless is not used in OFDM transmission 183 usually carrying data packets alone.

In other words, in OFDM transmission 184 for data packets and signature signal, the signature signal is transmitted in low power using the zero-th subcarrier 185.

Although the channelization in the 5 GHz UNII band is 20 MHz, the baseband spectral occupancy is 16.667 MHz, as shown by reference numeral 186. In other words, the remaining band—that is, the 20 MHZ spectral mask minus 16.667 MHz spectral occupancy 186—is used as a guard band, provided so as to combat roll-off produced in filter design.

In the example shown in FIG. 7, the frequency of the ±27th subcarriers 191 that are located at the boundaries of the spectrum used and are not used in usual OFDM transmission 183 carrying data packets alone, is used.

That is, in OFDM transmission 192 of data packets and signature signal, the signature signal is transmitted using the ±27th subcarriers 193. The transmission of the ±27th subcarriers 193 is performed in lower power than transmission of other subcarriers, so as to moderate the requirement imposed on the filter of the receiving end by reducing power of additional subcarriers.

In the example shown in FIG. 7, twice as much spectrum are obtained for the transmission of signature signals compared to the example of FIG. 6, and consequently it is possible to transmit twice as much signature signals. By this means, it is possible to double the code space or the beam range that can be addressed by a given length of code and reduce the detection time by a factor of two. Also, it is possible to facilitate the synchronization of the correlator and code at the receiving end.

Incidentally, the zero-th subcarrier 185 and ±27th subcarriers 193 may be used concurrently.

In all the above-described examples, the frequency band that is not used for data packet transmission can be utilized for signature signal transmission.

A plurality of users belonging to differing beam groups may transmit signature signals concurrently, so that each user is able to determine whether or not the signature signal the same as the one assigned thereto by AP 110 is being transmitted. Consequently, preferably, for example, a spreading code may be used as a signature signal. By using spreading codes having high autocorrelation characteristics, signature signal detection can be performed highly successfully. In addition, by using spreading codes having low cross-correlation characteristics, the probability of error detection in signature signals can be reduced. By thus using spreading codes as signature signals, the presence or absence of signature signals suggesting whether or not other users in the same beam group have already been performing transmission can be determined accurately using a correlator (matched filter).

In addition, as shown in FIG. 6, when the zero-th subcarrier 185 is used for transmission of signature signals, signature signals may be given characteristics such that their average value becomes zero. By this means, it is possible to minimize the impact of DC offset which occurs in the transmitting user's D/A converter and in the receiving user's A/D converter.

In addition, if a spreading code is used as a signature signal, even if transmission of a signature signal is performed in lower transmission power than transmission of a data packet, the low power can be compensated for by the processing gain at the receiving end.

Instead of using a spreading code as a signature signal, it is also possible to utilize the orthogonality between subcarriers in the frequency domain. As shown in FIG. 8, three orthogonal subcarriers 194—that is, the ±27th and 0th subcarriers—are obtained. These subcarriers 194 can be used as separately identified signature signals. In this example, three signature signals are associated respectively with the ±27th and zero-th subcarriers. Although according to this mechanism the number of signature signals may be limited to the number of subcarriers, signature signal detection may be performed in high speed by measuring the power of individual frequencies by the apparatus of the receiving end.

To support the concept of signature signals, the enhanced CSMA algorithm needs to be modified to support two state-determining variables, namely the CCA (Clear Channel Assessment) value and the signature signal detection value, as shown in FIG. 6. These values determine the three operation modes shown in FIG. 9 as decrement time units, namely operation modes 604, 605 and 606 marked by the slot time, detection time, and N/A (no transmission) time.

Figure 9:
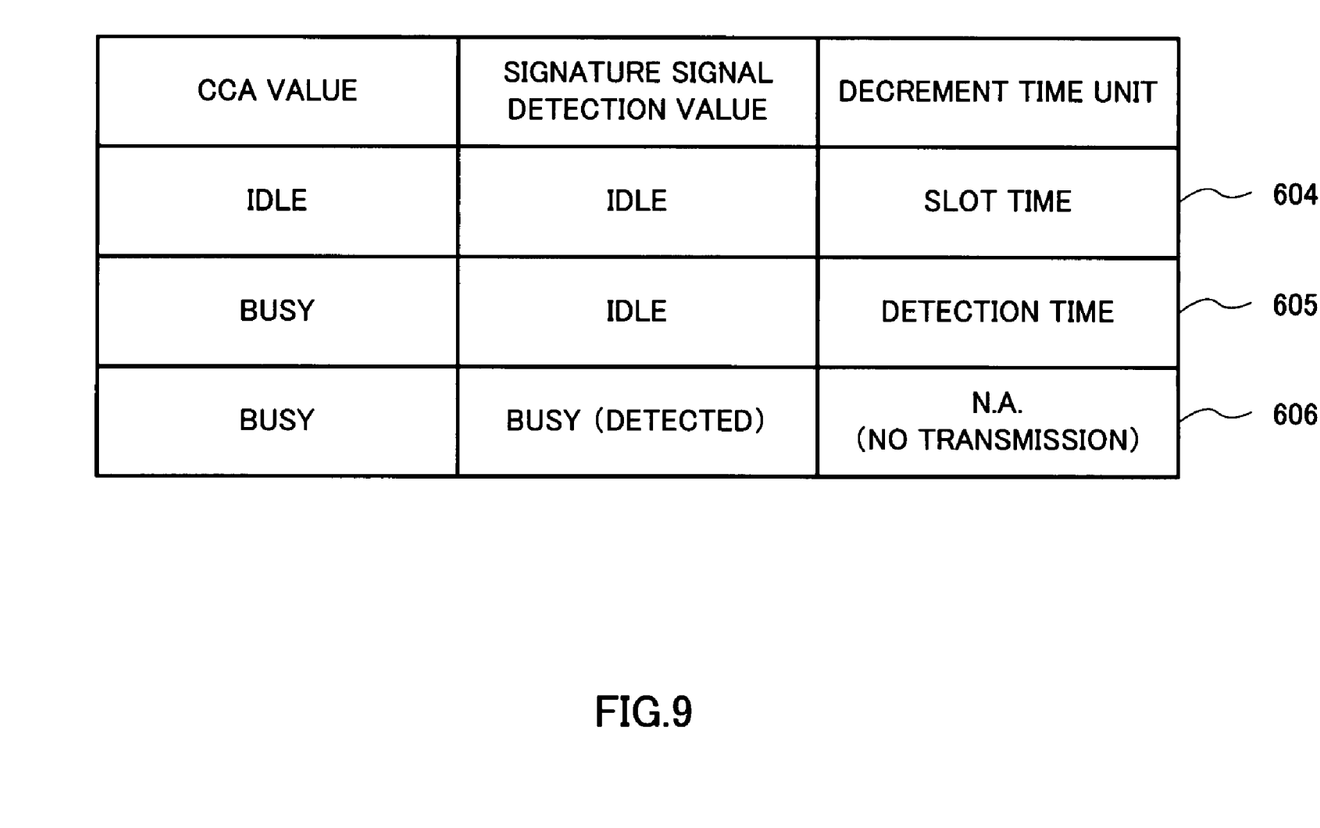
FIG. 9 is a view for explaining an operation mode of an enhanced CSMA algorithm according to an embodiment of the present invention.
Figure 10:
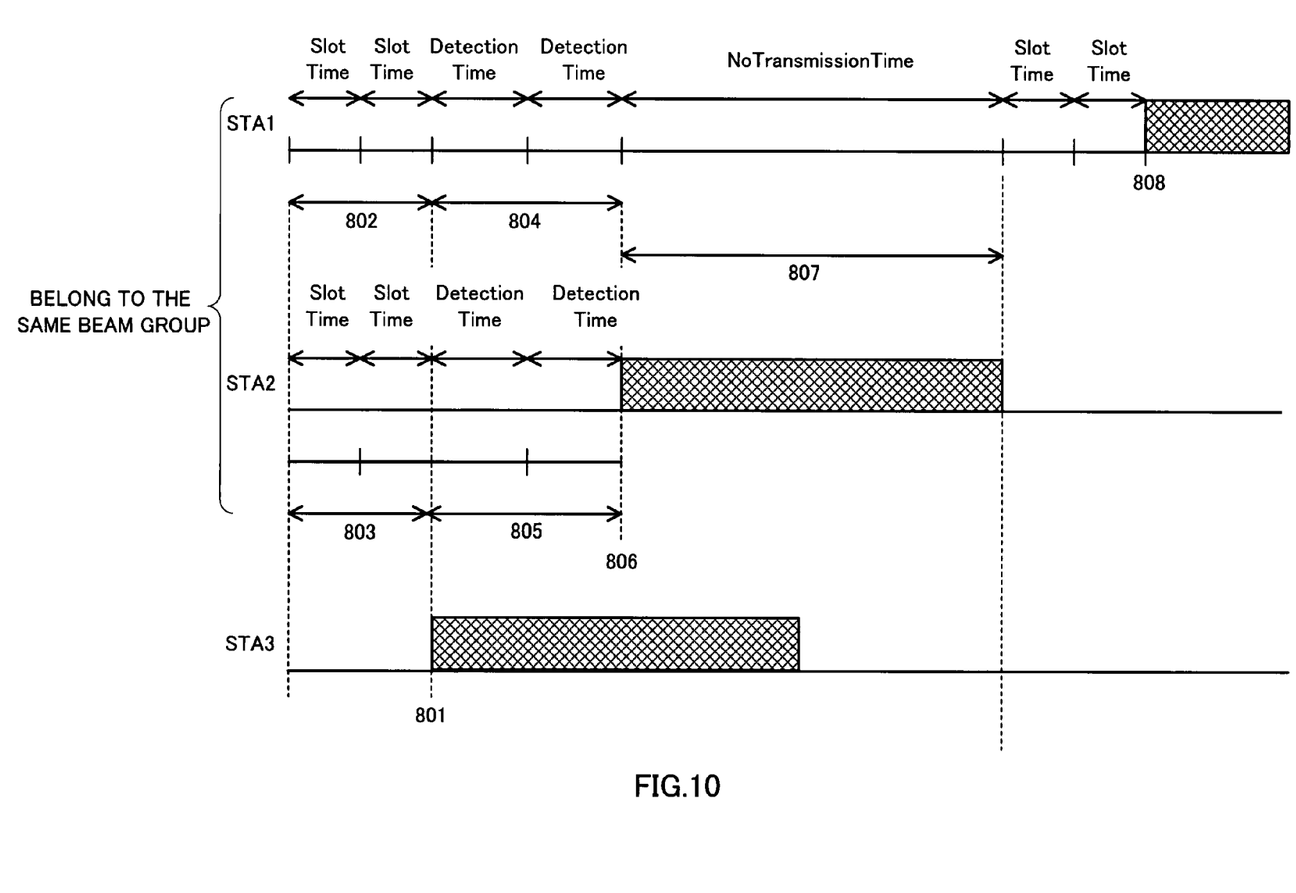
FIG. 10 is a timing chart of an enhanced CSMA algorithm according to an embodiment of the present invention.

An example of operation where there are three STAs (referred to as "STA 1," "STA 2" and "STA 3" in this example) will be described following the operation mode shown in FIG. 9 and the flowchart of the enhanced CSMA algorithm of FIG. 5. STA 1 and STA 2 belong to the same beam group and share the same signature signal, while the third, STA3, belongs to a different beam group and at the same time has a different signature signal. Initially, assume that medium 150 is busy, STA 1 selects a random backoff value of 6 and STA 2 selects a random backoff value of 4. As shown in FIG. 10, STA3 starts transmission at time instant 801. Up until this instant, STA1 and STA2 decrement their respective backoff counter values, as shown in their slot periods (that is, periods 802 and 803). Once STA 3 starts transmission, the CCA algorithm detects that medium 150 is busy and, as a result, the backoff counter value is decremented one by one. Periods 804 and 805 indicate that the backoff counter values of STA 1 and STA 2 are reduced in detection time units.

At time 806, the random backoff of STA 2 (selected to be 4) is exhausted and STA 2 starts transmission. By this means, STA 1 needs to switch its operation mode to the operation mode designated by the reference numeral 606 during period 807 in which STA 2 performs transmission, and hold transmission. When the transmission by STA 2 is completed, STA 1 is no longer able to detect that medium 150 is busy using the CCA algorithm, and so switches to the operation mode designated by the reference numeral 604 in FIG. 9. After the backoff counter value is decremented down to zero (in slot time units), STA 1 acquires the right to access medium 150 and starts transmission at the instant designated by the reference numeral 808.

According to this embodiment, STAs 120 to 140 are allocated to beam groups defined by the coverage areas of directional beams formed by multi-beam antenna 111 of AP 110 according to the locations of STA 120 to 140, and signature signals, which are unique to the respective groups, are assigned to allocated STAs 120 to 140, so that, when a plurality of STAs that contend for medium 150 at the same time belong to different beam groups, AP 110 has a transmission and reception section on a per beam basis and the STAs can communicate concurrently with SDMA-capable AP 110, and throughout in wireless LAN 100 can be improved.

Incidentally, wireless LAN 100 described in this embodiment has several applicable technical fields. That is, in companies/corporations, users may use wireless access-capable notebook computers at their desks and move these to meeting rooms and elsewhere. At home, an AP may be connected to a home AV server which may consist of a set top box, media player, and portal to the Internet, and devices equipped with wireless access functions such as display panels, cameras and notebook computers may be used to access the Internet or medium stored in the home AV server.

In addition, wireless LAN 100 according to this embodiment is applicable to cellular hotspots such as office building lobbies or coffee shops where STAs using data services may gain access.

The present specification is based on Japanese Patent Application No. 2003-324793, filed on Sep. 17, 2003, the entire content of which is expressly incorporated herein by reference.

INDUSTRIAL APPLICABILITY

The carrier sense multiple access method, wireless base station apparatus and wireless terminal apparatus of the present invention have the advantage of improving throughput in a wireless network and are applicable in a wireless network such as a wireless LAN.

The invention claimed is:

1. A carrier sense multiple access method implemented in a wireless network comprising a plurality of wireless terminal apparatuses and a wireless base station apparatus, said wireless base station apparatus being capable of space division multiple access and comprising an antenna section that forms a directional beam according to locations of the plurality of wireless terminal apparatuses and a plurality of transmission and reception sections that are connected with said antenna section and are capable of parallel operation, the method comprising:

an allocation step of allocating, in the wireless base station apparatus, the plurality of wireless terminal apparatuses to groups defined by coverage areas of the directional beam;

an assigning step of assigning, in the wireless base station apparatus, signature signals to the plurality of wireless terminal apparatuses allocated in the allocation step, each of the signature signals being unique to each of the groups;

a detection step of detecting, in at least one of the plurality of wireless terminal apparatuses, whether or not a signature signal assigned in the assigning step is present in a medium to be accessed;

a determination step of determining, in the at least one wireless terminal apparatus, whether or not the medium is being used for data packet transmission;

a decrement step of: decrementing, in the at least one wireless terminal apparatus, a backoff value at every slot time when the medium is determined to be idle; decrementing, in the at least one wireless terminal apparatus, the backoff value at every detection time when the medium is determined to be being used for data packet transmission by another wireless terminal apparatus allocated to a different group from that of the at least one wireless terminal apparatus; and not decrementing, in the at least one wireless terminal apparatus, the backoff value until an end of data packet transmission using the medium by another wireless terminal apparatus allocated to the same group as that of the at least one wireless terminal apparatus, when the medium is determined to be being used for data packet transmission by the other wireless terminal apparatus allocated to the same group; and a transmission step of concurrently transmitting, from the at least one wireless terminal apparatus, the signature signal and a data packet addressed to the wireless base station apparatus when the signature signal allocated to the same group is not present in the medium as a result of the detection in the detection step and the backoff value is decremented to zero in the decrement step, wherein:

every detection time is longer than the slot time.

2. The carrier sense multiple access method according to claim 1, wherein, in the transmission step, in a band used in communication, a frequency of a center part of said band that is not used for transmission of the data packet is used for transmission of the signature signal.

3. The carrier sense multiple access method according to claim 2, where the signature signal transmitted using the frequency of the center part has a characteristic such that an average value of said signature signal is zero.

4. The carrier sense multiple access method according to claim 1, wherein, in the transmission step, in a band used in communication, frequencies of boundaries of said band that are not used for transmission of the data packet are used for transmission of the signature signal.

5. The carrier sense multiple access method according to claim 1, wherein, in the transmission step, in a band used in communication, frequencies of a center part and boundaries of said band that are not used for transmission of the data packet are used for transmission of the signature signal.

6. The carrier sense multiple access method according to claim 1, wherein:

the signature signal is associated on a per group basis with a plurality of frequencies in a band used in communication that are not used for transmission of the data packet in the transmission step; and in the transmission step, the signature signal is transmitted using the frequencies associated with said signature signal.

7. The carrier sense multiple access method according to claim 1, wherein:

the signature signal has an autocorrelation characteristic above a predetermined level and a cross correlation characteristic below said predetermined level; and in the detection step, the presence or absence of the signature signal is detected by performing a correlation calculation using said signature signal.

8. The carrier sense multiple access method according to claim 1, wherein, in the transmission step, transmission of the signature signal is performed in lower transmission power than in transmission of the data packet.

9. A wireless terminal apparatus comprising:

a reception section that receives a signature signal transmitted from a wireless base station apparatus that is a communication partner, the signature signal being unique to each of groups defined by coverage areas of a directional beam formed by an antenna section of the wireless base station apparatus according to locations of a plurality of wireless terminal apparatuses including the wireless terminal apparatus;

a detection section that detects whether or not the signature signal is present in a medium to be accessed;

a determination section that determines whether or not the medium is being used for data packet transmission;

a decrement section that: decrements a backoff value at every slot time when the medium is determined to be idle; decrements the backoff value at every detection time when the medium is determined to be being used for data packet transmission by another wireless terminal apparatus allocated to a different group from that of the wireless terminal apparatus; and not decrementing the backoff value until an end of data packet transmission using the medium by another wireless terminal apparatus allocated to the same group as that of the wireless terminal apparatus, when the medium is determined to be being used for data packet transmission by the other wireless terminal apparatus allocated to the same group; and a transmission section that transmits concurrently the signature signal and a data packet addressed to the wireless base station apparatus when the signature signal allocated to the same group is not present in the medium as a result of the detection in the detection section and the backoff value is decremented to zero in the decrement section, wherein:

every detection time is longer than the slot time.

* * * * *